US010575633B2

(12) United States Patent
Tropper

(10) Patent No.: US 10,575,633 B2
(45) Date of Patent: Mar. 3, 2020

(54) PIPE RACK SYSTEM

(71) Applicant: LDR Global Industries, LLC, Chicago, IL (US)

(72) Inventor: Moshe Tropper, Lakewood, NJ (US)

(73) Assignee: LDR Global Industries, LLC, Chicago, IL (US)

( * ) Notice: Subject to any disclaimer, the term of this patent is extended or adjusted under 35 U.S.C. 154(b) by 0 days.

(21) Appl. No.: 15/267,368

(22) Filed: Sep. 16, 2016

(65) Prior Publication Data

US 2017/0172295 A1 Jun. 22, 2017

Related U.S. Application Data

(60) Provisional application No. 62/270,875, filed on Dec. 22, 2015.

(51) Int. Cl.
| | |
|---|---|
| *A47B 55/00* | (2006.01) |
| *F16B 7/18* | (2006.01) |
| *A47B 47/02* | (2006.01) |
| *E04G 7/24* | (2006.01) |

(52) U.S. Cl.
CPC ............ *A47B 55/00* (2013.01); *A47B 47/027* (2013.01); *F16B 7/185* (2013.01); *E04G 7/24* (2013.01)

(58) Field of Classification Search
CPC ............... Y10T 403/34; Y10T 403/341; Y10T 403/342; Y10T 403/347; F16L 41/02; F16L 41/021; F16L 41/023; F16L 41/03; F16B 7/185; A47B 47/0016; A47B 47/0008
See application file for complete search history.

(56) References Cited

U.S. PATENT DOCUMENTS

| | | | | | |
|---|---|---|---|---|---|
| 2,474,727 | A | * | 6/1949 | Denier ................ | E04F 11/1817 403/173 |
| 3,648,404 | A | * | 3/1972 | Ogsbury .............. | A63H 33/102 403/176 |
| 3,834,549 | A | * | 9/1974 | Burg .................. | A47B 47/0016 211/189 |
| 3,901,613 | A | * | 8/1975 | Andersson ......... | A47B 47/0016 403/171 |
| 3,921,360 | A | * | 11/1975 | Baldwin ............... | E04B 1/1906 403/171 |
| 4,021,127 | A | * | 5/1977 | Gasparro ............. | A47B 47/005 403/171 |
| 4,358,866 | A | * | 11/1982 | Rhodes ................ | A47C 15/006 114/363 |

(Continued)

OTHER PUBLICATIONS www.globalindustrial.com/c/storage/fittings-framing-rail, Retrieved on Sep. 19, 2016.

*Primary Examiner* — Jonathan P Masinick
(74) *Attorney, Agent, or Firm* — Weiss & Arons LLP

(57) ABSTRACT

A pipe rack system and a multi-plane coupling for such a pipe rack system are provided. The multi-plane coupling includes a coupling body that forms at least a first receiver aligned with a first axis, a second receiver aligned with a second axis, and a third receiver aligned with a third axis. The pipe rack system includes pipe sections that are received and coupled in the receivers. The multi-plane coupling may be in the form of a three-way, four-way, five-way, or a six-way pipe fitting. The receivers may be female threaded sockets. The pipe sections may be threaded pipe that are threadedly received within the female threaded sockets of the pipe fittings.

12 Claims, 7 Drawing Sheets

(56) References Cited

U.S. PATENT DOCUMENTS

| | | | | |
|---|---|---|---|---|
| 4,438,615 A * | 3/1984 | Wendel | E04B 1/1906 | 403/171 |
| 4,576,350 A * | 3/1986 | Bond | B65B 67/12 | 248/100 |
| 4,679,961 A * | 7/1987 | Stewart | B64G 1/641 | 24/653 |
| 4,758,024 A * | 7/1988 | Kaempen | B29C 53/564 | 285/319 |
| 4,766,712 A * | 8/1988 | Hale | E04B 1/1903 | 403/171 |
| RE33,438 E * | 11/1990 | Stewart | B64G 1/641 | 24/653 |
| 5,069,456 A * | 12/1991 | Bellagamba | A63B 69/3644 | 473/264 |
| 5,307,527 A * | 5/1994 | Schober | E04H 4/14 | 297/254 |
| 5,480,355 A * | 1/1996 | Miller | A63G 1/12 | 472/29 |
| 5,580,181 A * | 12/1996 | Nomura | A47B 47/0016 | 403/170 |
| 5,667,329 A * | 9/1997 | Yoder, Jr. | A47C 4/02 | 285/317 |
| 5,690,446 A * | 11/1997 | Poissant | A63H 33/10 | 403/169 |
| 5,700,102 A * | 12/1997 | Feleppa | A47B 47/0016 | 403/170 |
| 6,413,004 B1 * | 7/2002 | Lin | B25B 7/02 | 403/171 |
| 6,672,789 B2 * | 1/2004 | Chen | F16B 7/185 | 403/171 |
| 6,854,238 B2 * | 2/2005 | Boots | A47B 47/027 | 403/176 |
| 6,857,246 B2 * | 2/2005 | Erbetta | E04H 15/36 | 135/124 |
| 8,585,312 B1 * | 11/2013 | Kosak | G09B 25/04 | 403/171 |
| 9,115,839 B1 * | 8/2015 | Serrano | F16L 41/03 | |
| 9,383,015 B2 * | 7/2016 | Cary | F16L 41/03 | |
| 2003/0165353 A1 * | 9/2003 | Clausell | E04B 1/19 | 403/56 |
| 2006/0001260 A1 * | 1/2006 | Thompson | F16L 41/03 | 285/125.1 |
| 2006/0087093 A1 * | 4/2006 | Silva | A47F 5/04 | 280/87.042 |
| 2006/0289066 A1 * | 12/2006 | Lesage | F16K 27/00 | 137/375 |
| 2012/0301215 A1 * | 11/2012 | Huang | A47B 47/0016 | 403/176 |
| 2013/0294817 A1 * | 11/2013 | Augustsson | F16B 7/185 | 403/217 |
| 2014/0072363 A1 * | 3/2014 | Boze | F16B 7/185 | 403/171 |
| 2015/0167713 A1 * | 6/2015 | Schaerer | F16B 7/185 | 403/171 |
| 2018/0243596 A1 * | 8/2018 | Kim | A62C 35/58 | |

* cited by examiner

US 10,575,633 B2

PIPE RACK SYSTEM

CROSS REFERENCE TO RELATED APPLICATIONS

This application claims priority from Provisional Patent Application 62/270,875 which was filed on Dec. 22, 2015 and which is hereby incorporated by reference herein in its entirety.

FIELD

This application relates generally to pipe couplings and rack systems formed with pipes coupled together with pipe couplings.

BACKGROUND

Rack systems are known. Normally such rack systems include various sizes, shapes, and types of struts that can be selectively coupled together in various sizes and shapes by use of various couplings so as to be part of a modular rack system. Modular rack systems are frequently used for shelving and/or other storage purposes. However, modular rack systems may be used for nearly any type of purpose, generally including the support of various items, and the terms "rack" and "shelf" and variations thereon understood as being used interchangeably herein without differentiation.

Racks and shelving units constructed of pipes and pipe couplings, hereinafter referred to as "pipe racks" or "pipe rack systems," are also known. Some such systems are constructed out of common plumbing pipes and associated plumbing pipe couplings. However, until now, the construction of such pipe rack systems has generally been limited based on limited types of couplings available for connecting sections of pipe.

SUMMARY

The present disclosure provides a pipe rack system as well as a coupling for such a pipe rack system, which provides additional possibilities and variations for the shape and construction of such pipe rack systems.

According to some aspects, a multi-plane coupling for a pipe rack system includes a coupling body that forms at least a first receiver aligned with a first axis, a second receiver aligned with a second axis, and a third receiver aligned with a third axis, wherein the first and second axes define a first plane, the second and third axes define a second plane, and the first and third axes define a third plane. Any one or more of the first, second, and third planes may optionally be perpendicular with one another. Any one or more of the first, second, and third axes may optionally be perpendicular to one another.

According to some aspects, the coupling body may form a fourth receiver aligned with a fourth axis. The fourth axis may be aligned with the first axis.

According to some aspects, the coupling body may form a fifth receiver aligned with a fifth axes. The fifth axis may be aligned with the second axis.

According to some aspects, the coupling body may form a sixth receiver aligned with a sixth axis. The sixth axis may be aligned with the third axis.

According to some aspects, a rack system includes the multi-plane coupling and one or more pipe sections coupled to the multi-playing coupling of the respective one or more of the receivers. One or more of the receivers may have internal threads, one or more of the pipes may have external threads disposed at an end thereof, and the end of the pipe may be threaded into a corresponding one of the threaded receivers.

In some arrangements, a coupling according to the present disclosure has the form of a five-way pipe fitting. In some arrangements, a coupling according to the present disclosure has the form of a six-way pipe fitting. In some arrangements, a coupling according to the present disclosure has the form of a four-way pipe fitting. In some arrangements, a coupling according to the present disclosure has the form of a three-way pipe fitting. The five-way pipe fitting may have the form of a cross fitting having four sockets that converge at a junction and disposed in and/or defining a plane with a fifth socket extending perpendicularly from the junction of the four sockets. The six-way pipe fitting may include a sixth socket extending perpendicularly from the junction of the four sockets and in the opposite direction from the fifth socket. The four-way pipe fitting may have the form of a tee fitting having three sockets that converge at a junction and disposed in and/or defining a plane and a fourth socket extending perpendicularly from the junction of the three sockets. Any one or more of the sockets may be a female threaded socket.

In some arrangements, a pipe rack system according to the present disclosure includes one or more pipe sections coupled to one or more respective sockets of a three-way pipe fitting, a four-way pipe fitting, a five-way pipe fitting, and/or a six-way pipe fitting of the disclosure. One or more of the pipe sections may be a threaded pipe. The threaded pipe may be threadedly received in a female threaded socket of the pipe fitting. In these arrangements, the pipes may form struts, columns, and/or other structural members, which may be joined together in various ways by one or more of the pipe fittings and/or couplings of the present disclosure in a modular fashion.

Any one or more of these aspects and/or arrangements may be combined together in modular form in a near infinite variety of combinations. In addition, additional types of couplings and/or structural members may also be combined with the fittings and/or couplings disclosed herein for forming a pipe rack system, as will be understood in the art.

Any one or more of these aspects may be combined with any one or more of the other aspects and/or additional aspects, arrangements, features, and/or technical effects that are apparent upon detailed inspection of the figures and the following description.

The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR § 1.56(a) exists.

DETAILED DESCRIPTION

Definitions

Figure 1:
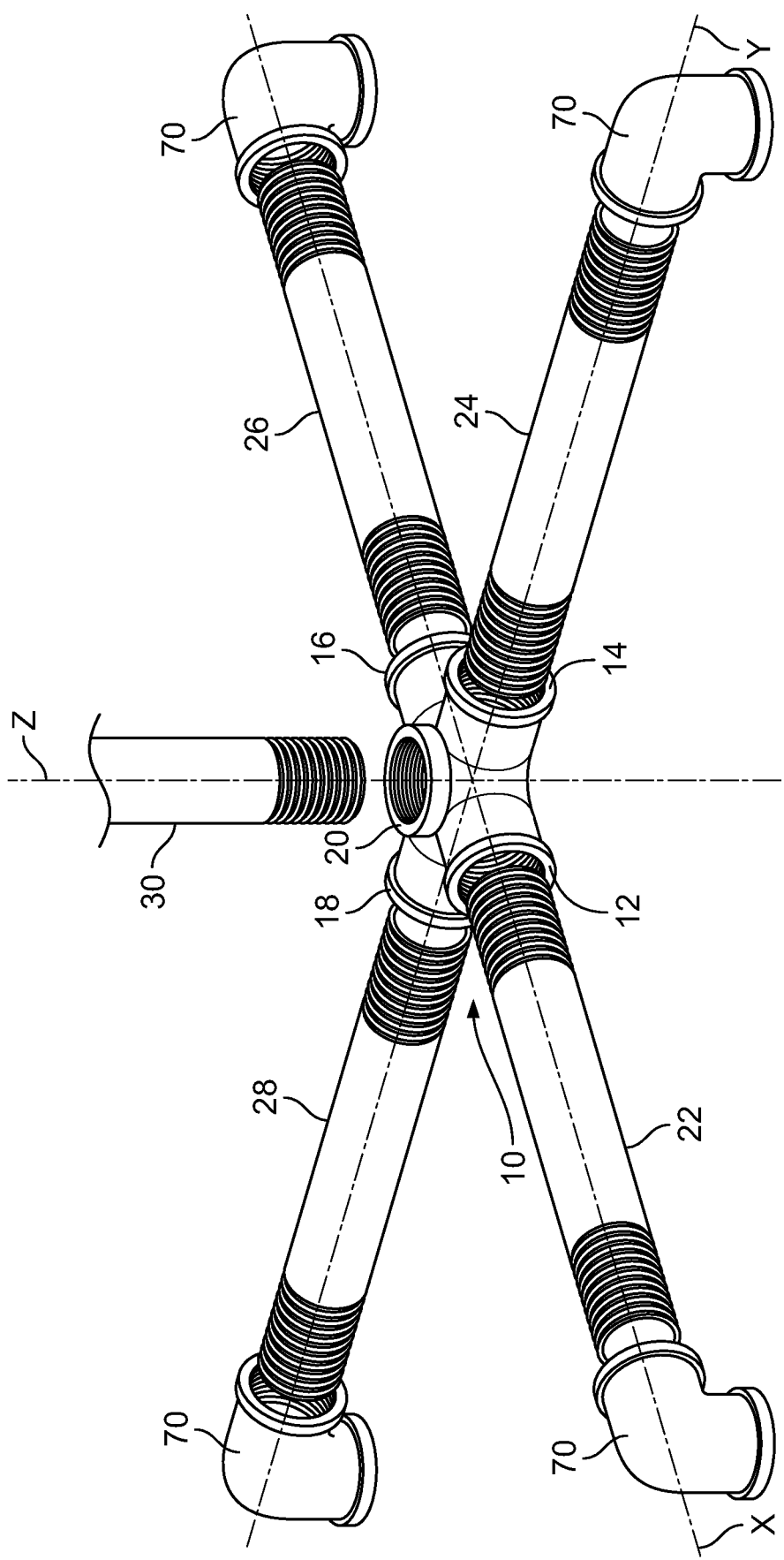
FIG. 1 is a schematic exploded view of a portion of a pipe rack system with a coupling according to an aspect of the present disclosure.

The following definitions are provided to determine how terms used in this application, and in particular how the claims, are to be construed. The organization of the definitions is for convenience only and is not intended to limit any of the definitions to any particular category.

"Rack" or "Rack System" means a framework including an elongated member or interconnected elongated members which is constructed an arranged for esthetic purposes, for items to be positioned on top one or more of the elongated members and/or suspended from one or more of the elongated members, or for other uses such as for furniture, the elongated members may be interconnected in full or in part by couplings.

"Pipe Rack" or "Pipe Rack System" means a rack in which one, some, or all of the elongated members are, comprise, or consist essentially of pipes.

"Threaded" means an extended ridged projection and/or trench depression extending in a substantially helical direction along the inner or outer surface of a substantially cylindrical member, said projection and/or depression constructed and arranged to fasten a male member within a defined lumen of a female member featuring a reciprocal projection and/or depression. Further descriptions of threaded arrangements are present in the article: Load and stress distribution in screw threads, by B. Kenny et al, Experimental Mechanics, Vol. 25, Issue 3, pp. 208-213, September 1985, which is incorporated by reference in its entirety.

"Elongated Member" means an item having a significantly larger (at least by a factor of 1.5, 2, 3, 4, 5, or greater) length than its width or height.

Embodiments

Methods and systems according to the present disclosure may have many different aspects, arrangements, and features in many different various combinations. Any one or more of the aspects, arrangements, and features disclosed herein may be combined with any one or more of the other aspects, arrangements, and features in any way suitable for providing any one or any combination of technical aspects in any useful manner. For the purposes of this disclosure, like reference numerals in the figures shall refer to like features unless otherwise indicated.

Turning now to the drawings, FIG. 1 illustrates at least one embodiment of the inventive concept in which a pipe rack system including a multi-plane coupling that connects five pipe sections at a single joint in three different planes. In this arrangement, the multi-plane coupling is in the form of a five-way pipe fitting 10. The five-way pipe fitting generally has the form of a four-way cross fitting having first, second, third and fourth sockets 12, 14, 16, and 18 disposed in a substantially horizontal plane and crossing at a central junction and a fifth socket 20 extending upwardly from the central junction substantially perpendicular to the plane of the first through fourth sockets. Each of the sockets 12-20 preferably extends or is aligned through a common center or junction point. Each of the sockets 12-20 is preferably a female threaded socket, i.e., a socket having interior threads.

The five-way pipe fitting 10 is able to connect five different pipe sections together at a common coupling. A first pipe section 22 can be received in and coupled the first socket 12. A second pipe section can be received in and coupled to the second socket 14. A third pipe section can be received in and coupled to the third socket 16. A fourth pipe section 18 can be received in and coupled to the fourth socket 18. A fifth pipe section 30 can be received in and coupled to the fifth socket 20. Of course, fewer than five pipe section can be coupled to the five-way pipe fitting 10. Each of the pipe sections 22-30 is preferably a threaded pipe having at least one threaded end, i.e., outside threads at the end of the pipe, complementary to the interior threads of the female threaded sockets. In this way, the threaded end of each of the pipe sections 22-30 can be threadedly coupled to the corresponding female threaded sockets 12-20.

The first socket 12 extends along a first axis. The second socket 14 extends along a second axis. The third socket 16 extends along a third axis. The fourth socket extends along a fourth axis. The fifth socket 20 extends along a fifth axis. In this arrangement, the first and third axes are coaxial, i.e., extend along the same axis, along an X-axis. Similarly, the second and third axes are also coaxial along a Y-axis. The X-axis is perpendicular to the Y-axis. The fifth axis extends along a Z-axis. The X- and Y-axes are perpendicular to each other, and the Z-axis is perpendicular to the X- and Y-axes, and preferably extends through the junction of the X- and Y-axes. Thus, the first through fourth sockets 12-18 define or lie in a first plane. The first, third, and fifth sockets 12, 16, 20 define or lie in a second plane. The second, fourth, and fifth sockets 14, 18, 20 define or lie in a third plane. Each of the first, second, and third planes is perpendicular to the other of the planes, thereby forming a rectangular joint. In other words, the first and third sockets 12 and 16 open up to and/or extend in opposite directions along the X-axis, and the second and fourth sockets 14 and 18 open up to and/or extend in opposite directions along Y-axis, while the fifth socket 20 opens up to and/or extends perpendicular to the first through fourth sockets 12-18.

Figure 2:
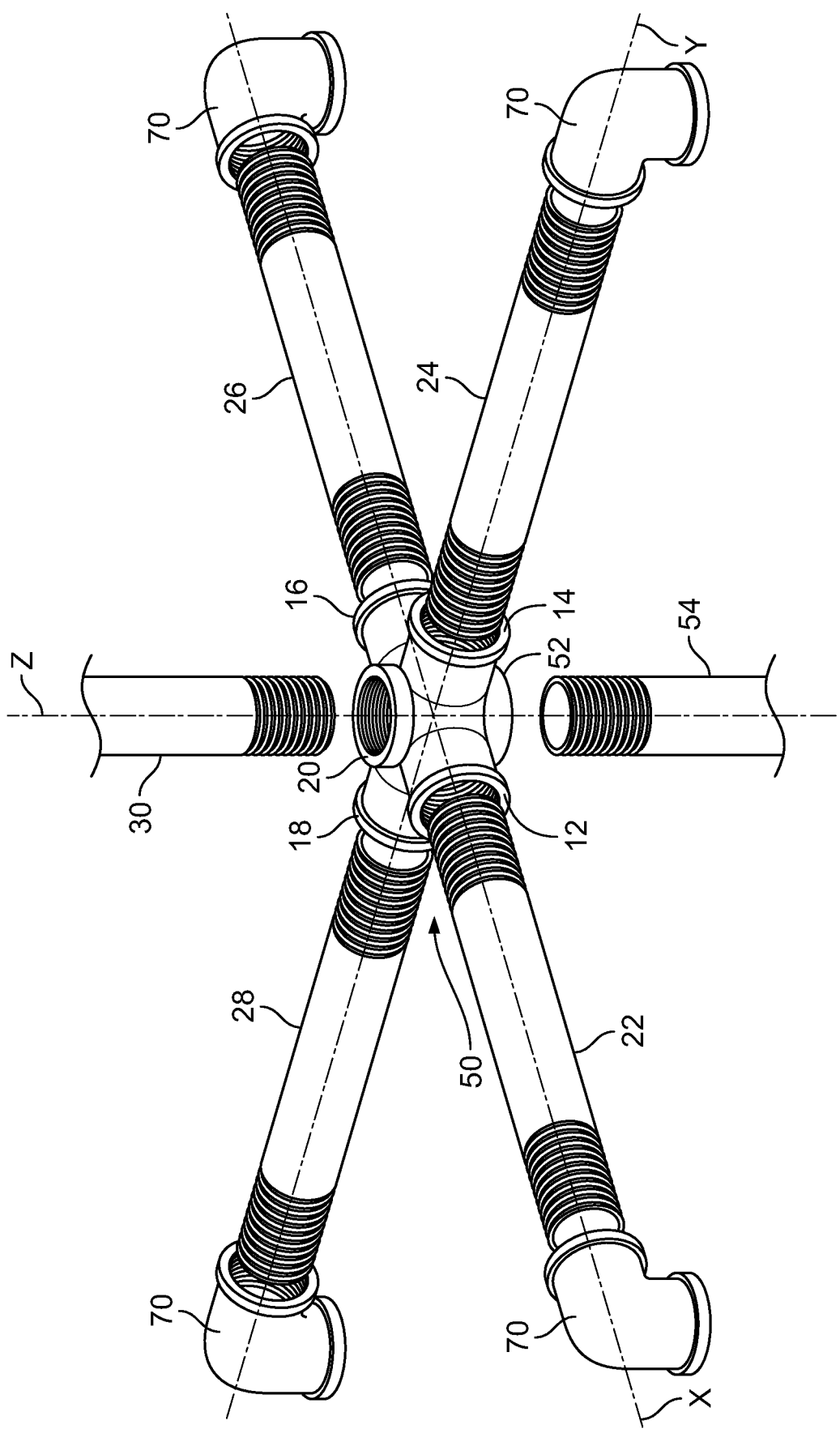
FIG. 2 is a schematic exploded view of a portion of a pipe rack system with a coupling according to another aspect of the present disclosure.

Turning to FIG. 2, a pipe rack system including another multi-plane coupling that connects six pipe sections at a single joint in three different planes. In this arrangement, the multi-plane coupling is in the form of a six-way pipe fitting 50. Similar to the five-way pipe fitting 10, the six-way pipe fitting 50 also has the first through fifth socket 12, 14, 16, 18, and 20 that can receive the first through fifth pipe sections 22, 24, 26, 28, and 30, respectively, as already described previously. However, in addition, the six-way pipe fitting 50 also includes a sixth socket 52 extending downwardly from the central junction perpendicular to the plane of the first through fourth sockets 12-18. A sixth pipe section 54 can be received in and coupled to the sixth socket 52. The sixth socket may be a female threaded socket with interior threads. The sixth pipe section 54 is preferably a threaded pipe having at least one threaded end female threaded socket so that the threaded end of each of the sixth pipe section 52 can be threadedly coupled to the sixth female threaded socket 54.

The sixth socket 52 also preferably extends or is aligned through the common center or junction point. Thus, the sixth socket 52 extends along a sixth axis. The sixth axis is preferably coaxial with the fifth axis along the Z-axis. In other words, the fifth and sixth sockets 20 and 52 open up to and/or extend in opposite directions along the Z-axis. In this manner, the first through sixth sockets extend in sixth orthogonal directions along the X-, Y-, and Z-axes, thereby forming a rectangular joint.

Figure 3:
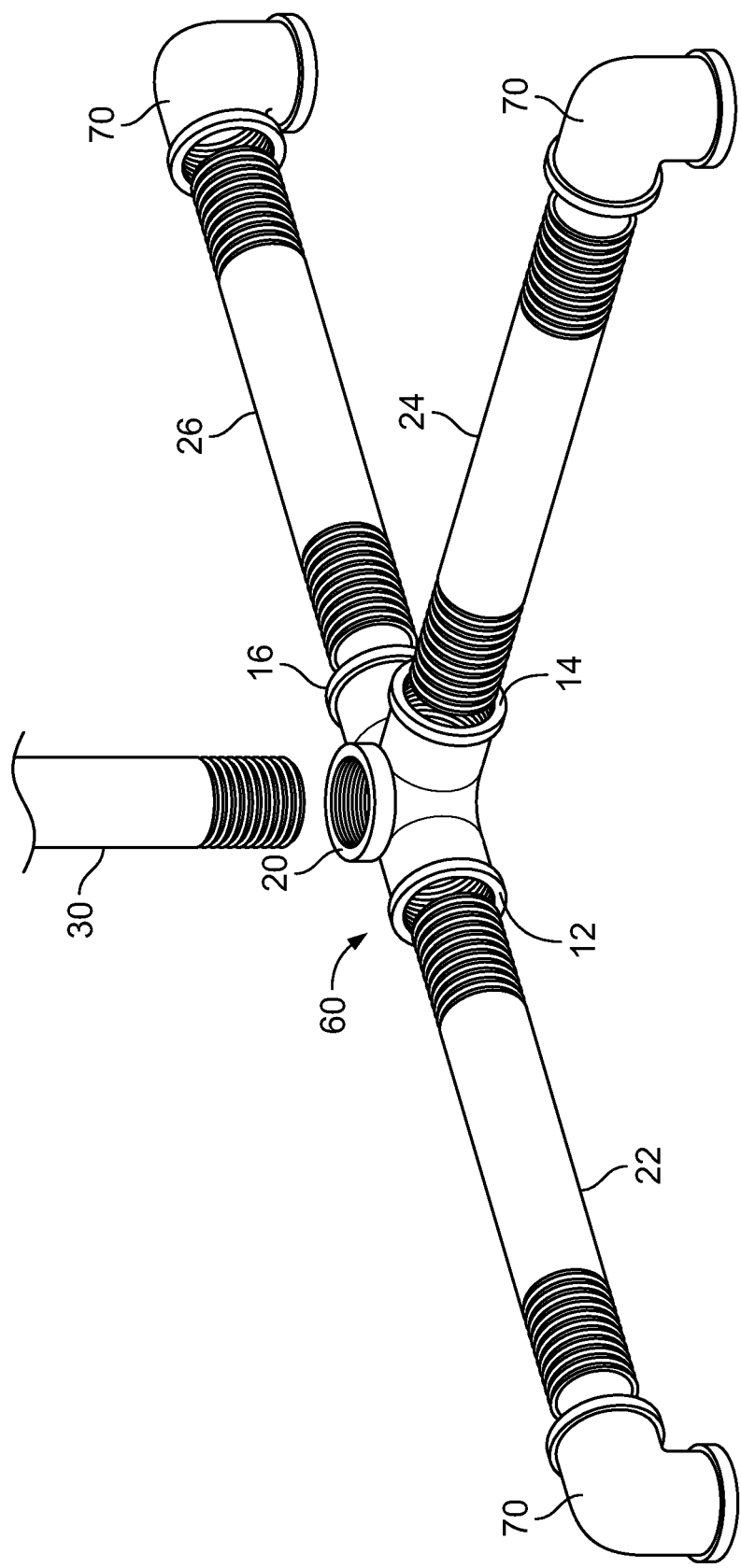
FIG. 3 is a schematic exploded view of a portion of a pipe rack system with a coupling according to a further aspect of the present disclosure.

FIG. 3 illustrates a pipe rack system including another multi-plane coupling that connects four pipe sections at a single joint in three different planes. In this arrangement, the multi-plane coupling is in the form of a four-way pipe fitting 60, which is generally the same as the five-way pipe fitting 10, except that the four-way pipe fitting 60 does not include the fourth socket 18. Rather, in the four-way pipe fitting 60, the first, second, and third sockets 12, 14, and 16 form a tee-fitting defining and/or lying in the X-Y plane, while the fifth socket 20 extends upwardly along the Z-axis in the X-Z and X-Y planes. In all other manners, the remaining features of the pipe rack system and the four-way pipe fitting 60 are substantially the same as described previously relative to FIGS. 1 and 2.

The pipe rack systems of the present disclosure are modular such that additional couplings and/or pipe sections may be combined in a near infinite variety of shapes, sizes, and constructions to build pipe rack systems of different shapes and sizes. Any number of the multi-plane couplings and pipe sections disclosed herein may be combined in various arrangements to form rack systems of different shapes and sizes. In addition as can be seen in each of FIGS. 1-3, additional components may be used as part of the pipe rack systems of the present disclosure. For example, single-plane couplings, such as elbow-fittings 70, may be coupled to one or more ends of the pipe sections 22, 24, 26, 28, 30 and/or 54. Other single-plane couplings, such as basic three-way tee-fittings and four-way cross-fittings may also be incorporated into a pipe rack system of the present disclosure. Additional structural members and couplings are also contemplated as being usable with pipe rack systems according the present disclosure.

Figure 4:
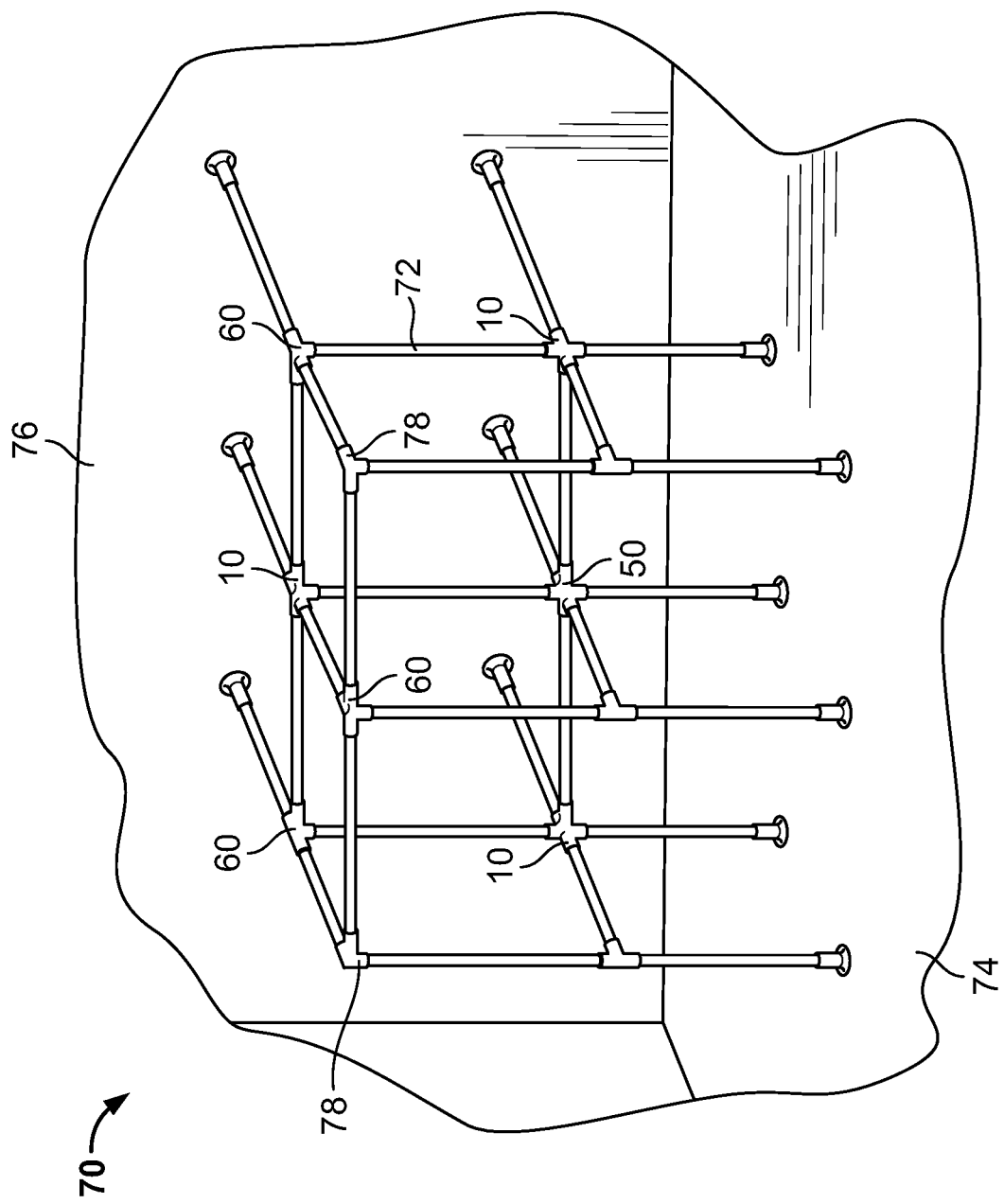
FIG. 4 is a schematic view of a portion of an exemplary pipe rack system incorporating couplings of each of FIGS. 1-3.

FIG. 4 illustrates a possible arrangement of a pipe rack system 70 in accordance with the present disclosure. In this arrangement, pipe sections 72 are coupled together with various couplings, including three of the five-way fittings 10, a six-way fitting 50, and three of the four-way fittings 60, as well as other couplings. The pipe sections 72 may be substantially the same as any of the first through sixth pipe sections 22, 24, 26, 28, 30, and 54. In this arrangement, the pipe rack system 70 includes pipe sections 72 that form vertical columns extending upwardly from a floor 74 and horizontal struts that extend outwardly from a wall 76. Here, the pipe rack system 70 forms a cage-like structure, which may be used to support shelves or other additional components. However, the pipe rack systems of the present disclosure are not limited the arrangements disclosed herein may be used to create other shapes and types of pipe racks.

In addition, the pipe rack system includes two multi-plane connectors in the form of a three-way fitting 78 in accordance with the principles of this disclosure. The three-way fitting 78 is generally the equivalent of a modified form of the five-way fitting 10, but without the third socket 16 and the fourth socket 18. The, the three-way fitting 78 includes the first, second, and fifth sockets 12, 14, and 20, which can then receive the first, second, and fifth pipe sections 22, 24, and 30, respectively, thereby forming an orthogonal corner coupling with three sockets coupled with three pipe sections, each coupled socket and pipe section extending along one of the X-, Y-, and Z-axes. The remaining features of the three-way fitting 78 are substantially identical to the corresponding portions described previously herein.

Although the multi-plane connectors 10, 50, 60, and 78 described herein are all formed with orthogonal socket axes, the connectors are not limited to such angular alignments. Rather, the axes of the sockets may in some arrangements may be aligned at other, non-perpendicular angular arrangements according to the present disclosure.

The multi-plane couplings disclosed herein provide more options for constructing pipe rack systems in different shapes and arrangements. As just example, while standard plumbing pipe shelving units are generally limited to a single bay of shelves, a pipe rack system utilizing the components disclosed herein may be easily used to construct a plumbing pipe shelving unit having two or more bays constructed next to each other. Additional technical effects of the present disclosure are also contemplated.

In at least one embodiment the pipes are engaged to the fastener/coupling in such a manner that the junction is not water tight and/or is otherwise unsuitable for plumbing purposes.

Figure 5:
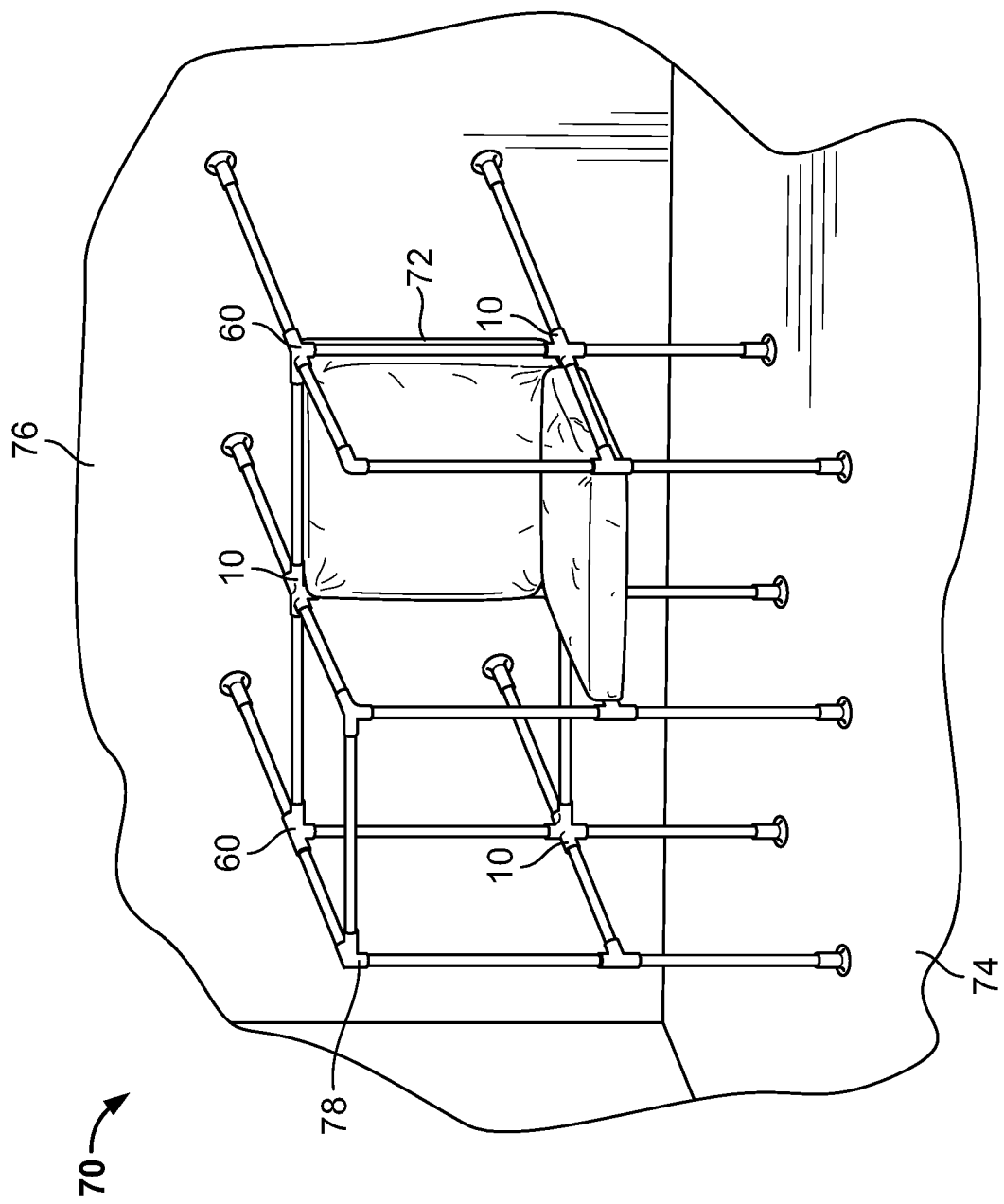
FIG. 5 is a schematic view of at least an exemplary pipe rack system used as furniture.
Figure 6:
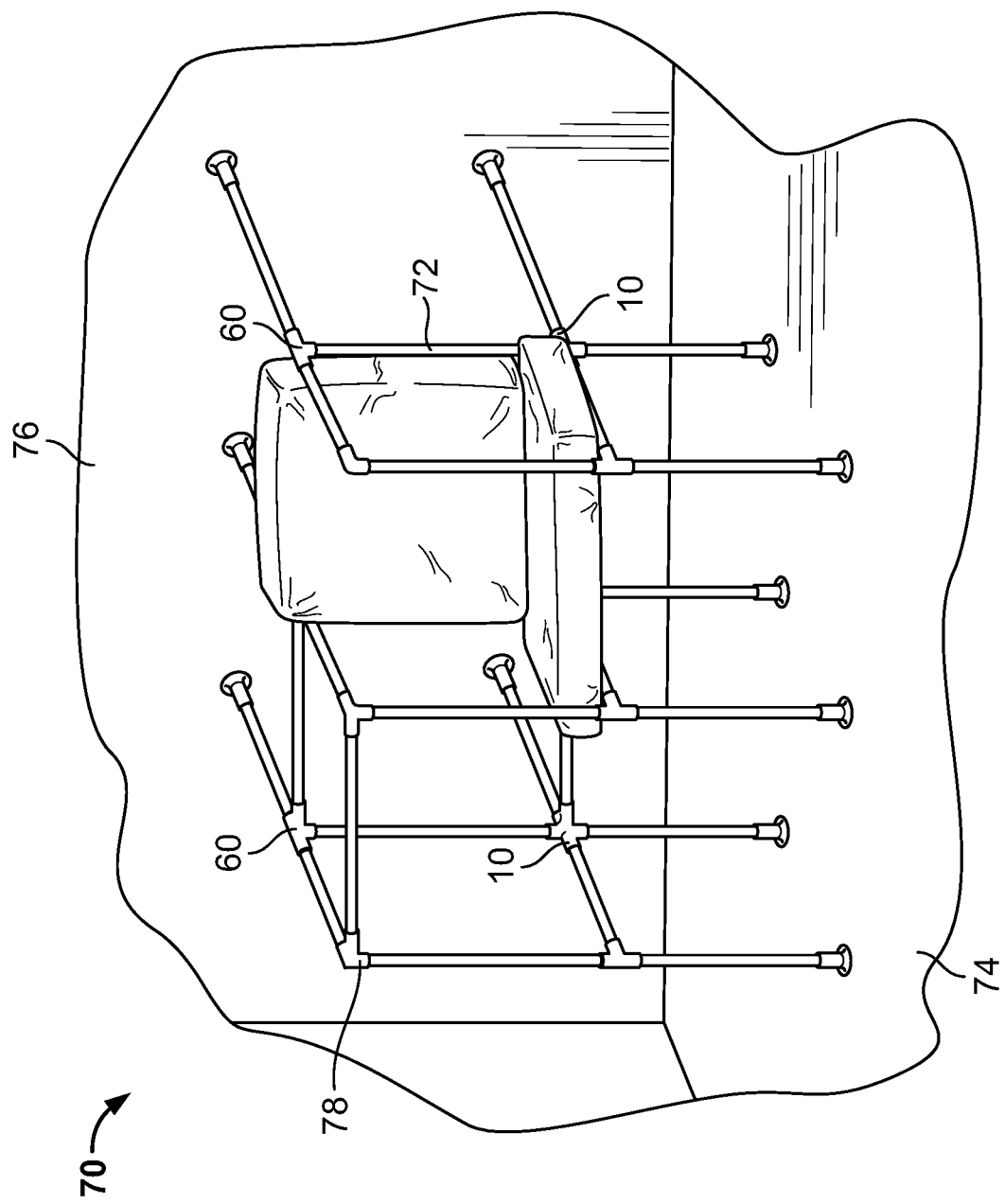
FIG. 6 is a schematic view of another exemplary pipe rack system used as a furniture.
Figure 7:
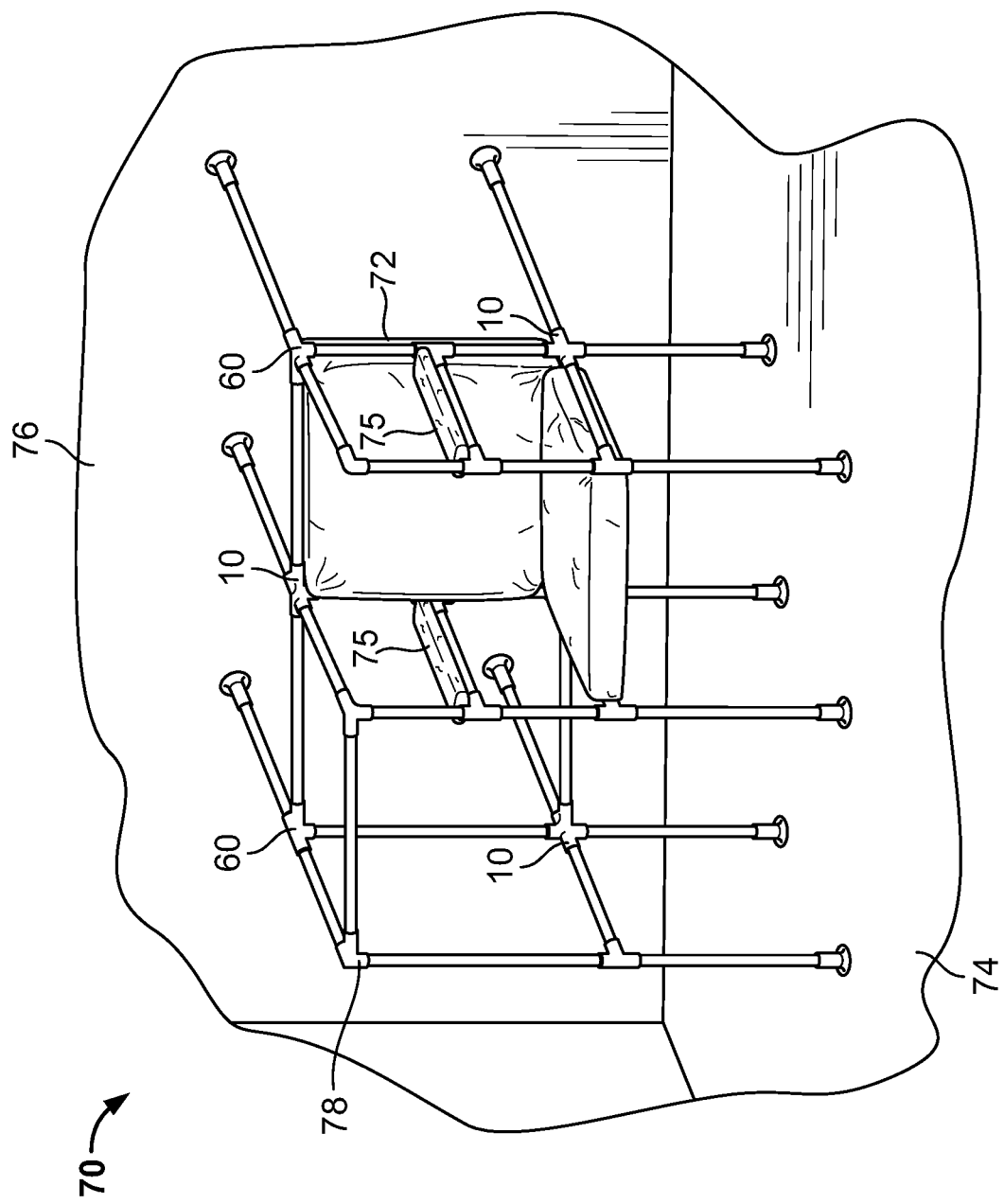
FIG. 7 is a schematic view of yet another exemplary pipe rack system used as a furniture.

Referring now to FIGS. 5-7 there is shown an embodiment in which the pipe rack is especially suited for use as an article of furniture. A person of ordinary skill in the art would appreciate that any of the embodiments encompassed in part or in full by the teachings inherent to FIGS. 1-4 are also suitable for use as furniture. In FIGS. 5-7, one or more of the earlier described defined plane(s) may in part or in full be spanned by one or more surface member(s) 11. Said surface member may be a rigid item such as a shelf or platform, may be a substantially flexible member such as a cushion, or may be any combination thereof. The surface member may have a consistent, sloped, or variable thickness rising out of the defined plane suitable for its use. Moreover the surface member may include a grade, curvature, or berm arrangement suitable for comfort or for retaining objects within a desired location. More than one surface member may be positioned along the same defined plane or along one or more other orthogonally defined plane(s). Any one, some, or all of the surface members may be in mere physical contact with or may be fixedly attached to one or more of the pipes 72, couplings 10, or any other portion of the pipe rack 74. In at least one embodiment, the surface member lies in part or in full in a location displaced from the defined plane. Such displacement may be a distance of 1 or more mm above, below, distal, proximal, left, right, north, south, east, or west, of the plane defined by part or all of pipes of the pipe rack system.

One or more of the surface members 11 may be positioned in locations suitable for use as a back rest or chair seat. In at least one embodiment a first surface member is positioned at a location suitable to serve as a chair seat and a second surface member is positioned at a location suitable to function as a platform within arm's reach of a person sitting in the seat. Such a platform may operate as an arm rest or as a tabletop.

In at least one embodiment, one or more of the couplings may lack one or more coupled pipes that would otherwise be present in an arrangement consistent with the coupling arrangement matrix pattern. (For example the matrix arrangement of the pipe rack system illustrated in FIG. 5 is consistent with that of FIG. 4 but lacks a pipe present in FIG. 4). Such an absence may be for the purpose of defining a volume which may enhance the form or function of the furniture. One may appreciate this by noting that a pipe rack constructed and arranged to serve at least in part as a chair, may lack a pipe to define a volume where a seated person's head and/or upper body may be positioned or would pass through when rising or being seated.

It should be noted that FIG. 6 shows the furniture with cushions and backings having different dimensions than the cushions in backings shown in FIG. 5. FIG. 7 shows armrests 75 which may also be incorporated into certain embodiments.

It should be further noted that the surface member may be constructed out of any suitable material. This includes but is not limited to the same materials as used for the pipes or couplings, as well as fabric, textiles, weaves, netting, mesh, and any combination thereof.

The pipe and/or the coupling may be constructed in part or in full out of any suitable material. Representative examples include but are not limited metals, plastics, wood, ceramics, and/or any of the materials described in the paper: Trade of Pipefitting Phase 2 Module 3 Pipe Processes Unit: 1 Piping Materials, by Finbar Smith, SOLAS (2014), which is incorporated by reference in its entirety.

In at least one embodiment any one, some, or all of the above described pipe rack systems or portions thereof, are altered mutatis mutandis such that the pipe(s) feature a female threaded pipe end and the coupling(s) feature a male threaded coupling end.

The above described pipe rack system is not an obvious variant of earlier related systems and displays advantages which are unexpected when compared thereto. Such advantages can be appreciated when comparing the inventive pipe rack system to the railing system described at the website having a URL of http://www.globalindustrial.com/c/storage/fittings-framing-rail (as accessed on Jun. 5, 2016), (both the URL and the railing system described therein are hereinafter collectively referred to as "pipe-railing"). Pipe railing systems result from clamping together various lengths of pipe. A railing however is not a rack system. Railings are constructed and arranged for guiding human movement. Rack systems are constructed and arranged for the very opposite purpose, supporting stationary items. As a result they are not analogous technologies. Moreover, because they use a clamp as opposed to threaded fastenings, pipe railing flex more and are less stable than the inventive threaded pipe rack system. Finally, the threaded fastenings facilitate easier and more efficient and rapid construction or disassembly. As a result the inventive pipe rack system is not an obvious variant of pipe-railings.

This detailed description is to be construed as exemplary only and does not describe every possible embodiment or combination, as describing every possible embodiment and combination would be impractical, if not impossible. One could implement numerous alternate embodiments and combinations, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

I claim:

1. A plumbing pipe rack system comprising:
a plurality of multi-plane plumbing pipe section couplings, each of the plurality of multi-plane couplings comprising a coupling body that forms at least a first receiver aligned with a first axis, a second receiver aligned with a second axis, and a third receiver aligned with a third axis, the coupling is constructed essentially out of metal, wherein:
  the coupling body of at least a portion of the plurality of multi-plane couplings further comprises at least a fourth receiver aligned with a fourth axis and a fifth receiver aligned with a fifth axis and each of the portion of coupling bodies is in the form of a five-way plumbing pipe fitting or greater than a five-way pipe fitting;
  the first and second axes define a first plane, the second and third axes define a second plane, and the first and third axes define a third plane; and
  each of the receivers extends through a common center or junction point; and
a plurality of plumbing pipe sections, each of the plurality of plumbing pipe sections comprising an inner diameter, wherein:
  each of the multi-plane couplings is engaged to the one or more pipe sections via one or more of the receivers, each of the receivers comprising a female threaded socket and one or more of the pipe sections comprising a threaded pipe that threadedly couples into a corresponding female threaded socket;
  at least a portion of the multi-plane couplings are engaged to the one or more plumbing pipe sections with a connection that is not watertight;
  each of the plurality of plumbing pipe sections extends the entire distance between the couplings.

2. The pipe rack system of claim 1, wherein two or more of the first, second, and third planes are perpendicular to one another.

3. The pipe rack system of claim 1, wherein two or more of the first, second, and third axes are perpendicular to one another.

4. The pipe rack system of claim 1, wherein the fourth axis is aligned with the first axis.

5. The pipe rack system of claim 1, wherein the fifth axis is aligned with the second axis.

6. The pipe rack system of claim 1, further comprising the coupling body forming a sixth receiver aligned with a sixth axis.

7. The pipe rack system of claim 6, wherein the sixth axis is aligned with the third axis.

8. The pipe rack system of claim 1 wherein the coupling bodies of the at least a portion of the plurality of multi-plane couplings are in the form of a six-way pipe fitting.

9. The pipe rack system of claim 1 wherein the plurality of pipe sections are constructed essentially out of plastic.

10. The pipe rack system of claim 1 further comprising a back rest, and a chair seat, wherein:
  each of the plurality of pipe sections has a first end and a second end;
  both the first end and second end of each pipe section are disposed along one of the first axis, second axis, and third axis and are engaged to at least one of the multi-plane couplings;
  at least two of the plurality of pipe sections and multi-plane couplings are arranged to form a repeating pattern;
  both the back rest and chair seat are positioned in an interruption in the repeating pattern;
  the back rest is aligned within the first plane;
  and the chair seat is aligned within the second plane.

11. The pipe rack system of claim 10 further comprising two arm rests positioned within the third plane, the arm rests further interrupting the repeating pattern.

12. At least one multi-plane coupling for use with a pipe rack system comprising a plurality of multi-plane couplings and a plurality of plumbing pipe sections each of the at least one multi-plane coupling comprising:
- a coupling body that forms at least a first receiver aligned with a first axis, a second receiver aligned with a second axis, and a third receiver aligned with a third axis wherein the coupling body further comprises at least a fourth receiver aligned with a fourth axis and a fifth receiver aligned with a fifth axis and is in the form of a five-way pipe fitting or greater than a five-way pipe fitting;

wherein:
- the first and second axes define a first plane, the second and third axes define a second plane, and the first and third axes define a third plane;
- each of the multi-plane couplings is engaged to one or more of the plurality of plumbing pipe sections via one or more of the receivers;
- each of the receives extends through a common center or junction point;
- each of the multi-plane couplings is engaged to the one or more plumbing pipe sections with a connection that is not watertight;
- each of the receivers comprises a female threaded socket and one or more of the plumbing pipe sections comprises a threaded pipe that threadedly couples into a corresponding female threaded socket; and
- each of the plurality of plumbing pipe sections extends the entire distance between the couplings and has an inner diameter.

\* \* \* \* \*